United States Patent
Pajunen et al.

(10) Patent No.: US 10,464,070 B2
(45) Date of Patent: Nov. 5, 2019

(54) HOPPER AND A MINERAL MATERIAL PROCESSING PLANT

(71) Applicant: Metso Minerals, Inc., Helsinki (FI)

(72) Inventors: Mikko Pajunen, Tampere (FI); Jouni Rajala, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 0 days.

(21) Appl. No.: 15/507,419

(22) PCT Filed: Sep. 11, 2014

(86) PCT No.: PCT/FI2014/050691
§ 371 (c)(1),
(2) Date: Feb. 28, 2017

(87) PCT Pub. No.: WO2016/038241
PCT Pub. Date: Mar. 17, 2016

(65) Prior Publication Data
US 2017/0304840 A1    Oct. 26, 2017

(51) Int. Cl.
*B02C 18/22*    (2006.01)
*B07B 11/06*    (2006.01)
(Continued)

(52) U.S. Cl.
CPC ........ *B02C 18/225* (2013.01); *B02C 18/2225* (2013.01); *B02C 21/02* (2013.01); *B02C 23/02* (2013.01); *B07B 11/06* (2013.01); *B07B 13/16* (2013.01); *B65G 11/206* (2013.01); *B02C 2013/28618* (2013.01)

(58) Field of Classification Search
CPC ....... B07B 11/06; B07B 13/16; B02C 18/225; B02C 23/02; B02C 21/02; B02C 2013/28618; B65G 11/206
See application file for complete search history.

(56) References Cited

U.S. PATENT DOCUMENTS 4,276,157 A * 6/1981 Haight .................... B07B 1/42
209/246
4,948,088 A    8/1990 Gonzalez
(Continued)

FOREIGN PATENT DOCUMENTS

CN    2770922 Y    4/2006
CN    203332934 U    12/2013
(Continued)

OTHER PUBLICATIONS

International Search Report and Written Opinion for International Application PCT/FI2014/050691 dated May 15, 2015.
(Continued)

*Primary Examiner* — Joseph C Rodriguez
*Assistant Examiner* — Kalyanavenkateshware Kumar
(74) *Attorney, Agent, or Firm* — Andrus Intellectual Property Law, LLP

(57) ABSTRACT

A hopper and a mineral material processing plant. The hopper includes hinged side walls configured to be pivoted into a first position and a second position and a connection wall attached between the hinged side walls. The connection wall includes a flexible member and is configured to fold together in response to the hinged side walls being pivoted from the first position to the second position.

14 Claims, 3 Drawing Sheets

(51) Int. Cl.
  *B07B 13/16* (2006.01)
  *B02C 21/02* (2006.01)
  *B02C 23/02* (2006.01)
  *B65G 11/20* (2006.01)
  *B02C 13/286* (2006.01)

(56) References Cited

U.S. PATENT DOCUMENTS

| | | |
|---|---|---|
| 6,695,390 B2 | 2/2004 | Morello |
| 2012/0273598 A1 | 11/2012 | Hoppel |
| 2013/0306437 A1* | 11/2013 | Dunn ..................... B60P 1/286 |
| | | 198/632 |
| 2016/0236231 A1* | 8/2016 | Chastine .............. B65G 11/106 |

FOREIGN PATENT DOCUMENTS

| | | |
|---|---|---|
| CN | 103764287 A | 4/2014 |
| EP | 0336815 A1 | 10/1989 |
| EP | 2664492 A1 | 11/2013 |
| GB | 2502144 A | 5/2017 |
| SU | 1648838 A1 | 5/1991 |
| WO | 2014005647 A1 | 1/2014 |

OTHER PUBLICATIONS

Office Action and Search Report for Russian Patent Application No. 20171100710 dated Jul. 9, 2018.
Office Action for Chinese Patent Application No. 2014800818297 dated Jul. 16, 2018.
Search Report for Chinese Patent Application No. 201480081897 dated Jul. 6, 2018.

* cited by examiner

HOPPER AND A MINERAL MATERIAL PROCESSING PLANT

FIELD OF INVENTION

The invention relates to a flexible connection wall. In particular, but not exclusively, the invention relates to a flexible connection wall for a hopper with inward folding. In particular, but not exclusively, the invention relates to a flexible wall of a feed hopper of a mineral material processing plant.

BACKGROUND OF THE INVENTION

Mineral material, such as stone, is retrieved to be processed from the ground either by exploding or by digging. The mineral material may also comprise natural stone, gravel and construction waste. Both mobile and fixed plants are used for processing. The material to be processed is fed with e.g. an excavator or a wheel loader into a feed hopper of the processing plant, from where the material is forwarded to be processed.

A mineral material processing plant comprises one or more crushers and/or screens and possibly further devices such as conveyors. The processing plant may be fixed or mobile. In particular mobile processing plants are used in urban surroundings in processing recyclable material such as construction waste.

Preferably a mobile mineral material processing plant should be ready to operate as soon as and as easily as possible after it has been transported to the target location. Similarly, the processing plant should be ready for transport as soon as and as easily as possible after the processing has been completed. This requires an efficient transform from operating state to transport state. Furthermore, the feed capacity of the processing plant should remain high despite the aforesaid requirement.

Mobile processing plants comprise feed hoppers and further elements that are switched from a transport position to operating position by folding. This often requires manual assembly steps. For example foldable feed hoppers comprise removable or hinged wall portions that need to be assembled by hand requiring time consuming labor.

The objective of the invention is to provide a wall element for quick assembly and maximized capacity.

SUMMARY

According to a first aspect of the invention there is provided a hopper, comprising:
  hinged side walls configured to be pivoted into a first position and a second position;
  a connection wall attached between the hinged side walls; wherein the connection wall comprises
  a flexible member; and wherein
  the connection wall is configured to fold together in response to the hinged side walls being pivoted from the first position to the second position.

The connection wall may further comprise a support member attached to the flexible member.

The hopper may further comprise means for pivoting the hinged side walls into the first and the second position.

The means for pivoting the hinged side walls may comprise hydraulic actuators.

The flexible member may comprise rubber.

The flexible member may be a one-piece member.

The flexible member may comprise flexible and rigid elements.

The support member may comprise a chain or cable.

The hopper may further comprise one or more support members.

The support member may be formed as a part of the flexible member.

According to a second aspect of the invention there is provided a mineral material processing plant comprising
  a processing unit; and
  a hopper according to the first aspect of the invention.

The mineral material processing plant may comprise a mobile plant.

According to a third aspect of the invention there is provided a method for operating a hopper, comprising:
  pivoting hinged side walls from a first position inwards towards a second position; wherein
  in response to the hinged side walls being pivoted, a connecting wall comprising a flexible member and a support member folds together.

The method may further comprise that a support member attached to the flexible member folds together.

Different embodiments of the present invention will be illustrated or have been illustrated only in connection with some aspects of the invention. A skilled person appreciates that any embodiment of an aspect of the invention may apply to the same aspect of the invention and other aspects

BRIEF DESCRIPTION OF THE DRAWINGS

The invention will now be described, by way of example, with reference to the accompanying drawings, in which.

DETAILED DESCRIPTION

In the following description, like numbers denote like elements. It should be appreciated that the illustrated figures are not entirely in scale, and that the figures mainly serve the purpose of illustrating embodiments of the invention.

Figure 1:
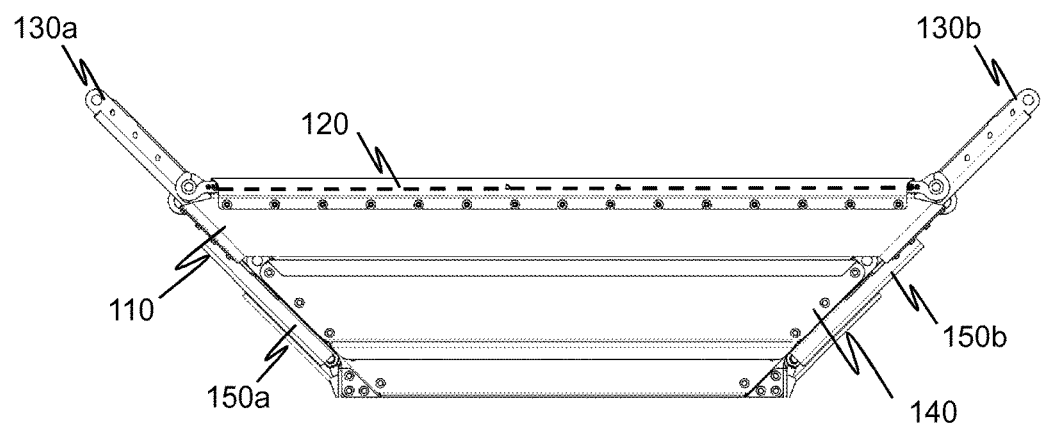
FIG. 1 shows a schematic view of a hopper according to an example embodiment of the invention in an open position.

FIG. 1 shows a schematic view of a hopper according to an example embodiment of the invention in an open position or state. FIG. 1 shows hinged side wall portions 130a,130b in an open position, i.e. in a first or operating position. The open position is used in operation of the hopper, wherein in the open position the volume, width and the surface area of the hopper is at its maximum. In the open position mineral material to be processed is loaded into the hopper for example from a conveyor or using a wheel loader or an excavator. FIG. 1 further shows means 150a,150b configured for opening and closing the hinged side wall elements, i.e. for pivoting the hinged side walls 130a,130b into the first position and to the second position. In an embodiment, the means 150a,150b comprise hydraulically driven actuators. In a further example embodiment, the actuators are electrically driven.

FIG. 1 further shows a connection wall between the hinged side walls 130a,130b comprising a flexible member 110. In a further embodiment, the connection wall comprises a support, or reinforcing, member 120. In an embodiment, the support member 120 is positioned inside the flexible member. In an example embodiment, the flexible member 110 comprises flexible material such as rubber. The flexible member 110 is, in an embodiment attached from the sides thereof to the hinged side wall portions 130a,130b. In a further example embodiment, the flexible member is attached from the bottom thereof to a rigid wall member 140. In an embodiment, the support member 120 is attached to the flexible member 110, or enclosed therein. The flexible member 110 comprises, in an embodiment, a single piece of flexible material, i.e. the flexible member is unbroken or one-part element.

In a further embodiment, the flexible member comprises elements of different materials and/or is made from several pieces of material. In a further example embodiment, not all portions of the flexible member 110 are flexible, for example, the flexible member 110 comprises rubber portions at the sides thereof and a steel element in the middle thereof or several rigid steel elements interposed with flexible, e.g. rubber, elements.

In a still further embodiment, the rigid wall member 140 is replaced with one or several flexible connection walls. In such a case each connection wall comprises a flexible member 110. In a further embodiment, each connection wall comprises a support member 120.

Figure 2:
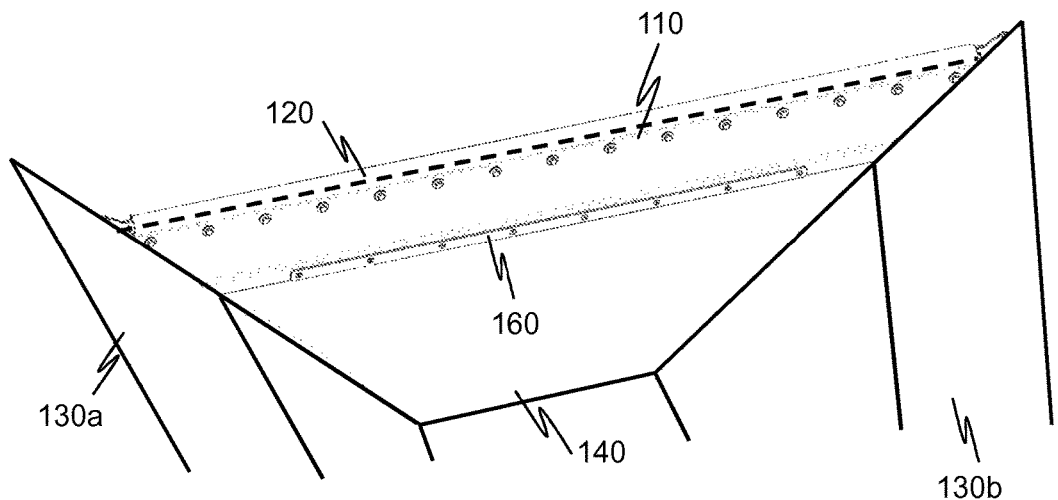
FIG. 2 shows a schematic view from the inside of a hopper according to an example embodiment of the invention in an open position.

FIG. 2 shows a schematic view from the inside of a hopper according to an example embodiment of the invention in an open position. Similarly as FIG. 1, FIG. 2 shows the hinged side wall portions 130a, 130b, the flexible connection wall comprising the flexible member 110 and the support member 120, and a rigid wall portion 140 to which the flexible member is, in an embodiment, attached with a connecting arrangement 160. A skilled person appreciates that the attachment of the flexible member 110 and the support member 120 are carried out in conventional manner with arrangements such as bolts and latches. In an embodiment, the connecting member 160 is integrated with an inner wear part (not shown) of the hopper, so that the flexible wall is easily replaced together with the wear part.

Figure 3:
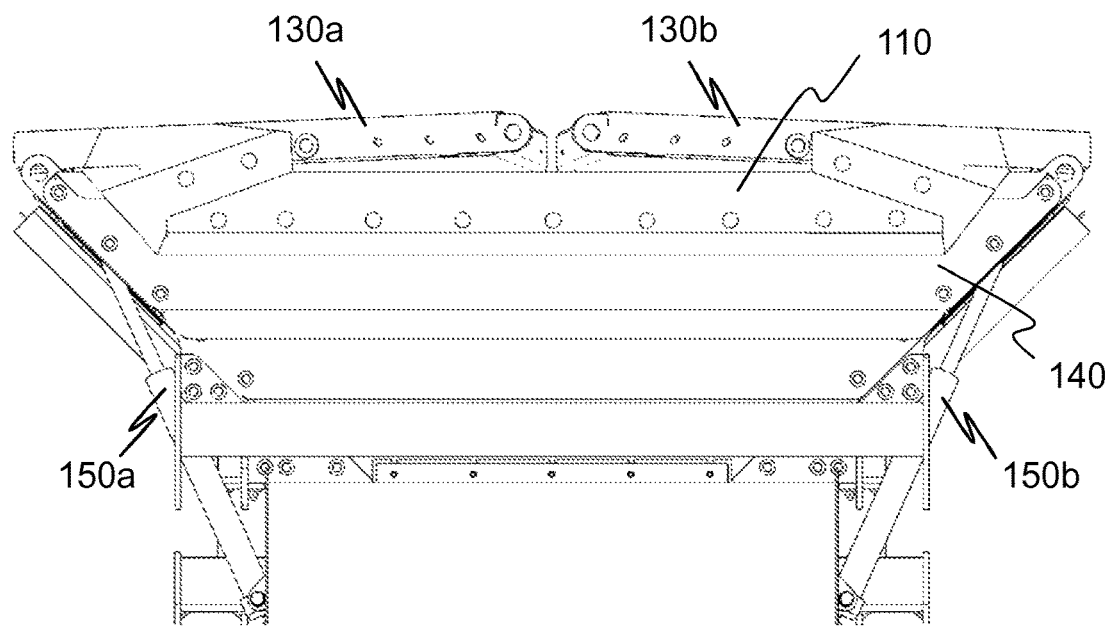
FIG. 3 shows a schematic view of a hopper according to an example embodiment of the invention in a closed position.

FIG. 3 shows a schematic view of a hopper according to an example embodiment of the invention in a closed position or state. FIG. 3 shows the hinged side wall portions 130a, 130b in a closed position, i.e. in a second or transport position. The closed position is used during transport, wherein in the closed position the width and height of the hopper is at its minimum. FIG. 3 further shows the means 150a,150b configured for opening and closing the hinged side wall elements.

FIG. 3 further shows the connection wall comprising the flexible member 110 and the support member (not shown) and the rigid wall portion 140. The connection wall is folded together as the hinged side wall portions 130a,130b are in the closed position. In an embodiment the flexible member 110 is configured to fold together on the outside of the hopper. Alternatively, the flexible member 110 is configured to fold together on the inside of the hopper. As the flexible member 110 folds together, and in an embodiment the support member 120 therewith, it folds, or is pleated, in such a way as to lay one part closely over another so that the width thereof is reduced. In a folded state, the flexible member 120 does not substantially protrude, i.e. the thickness thereof does not substantially increase, as it is folded together in a way reminiscent of folding laundry.

Figure 4:
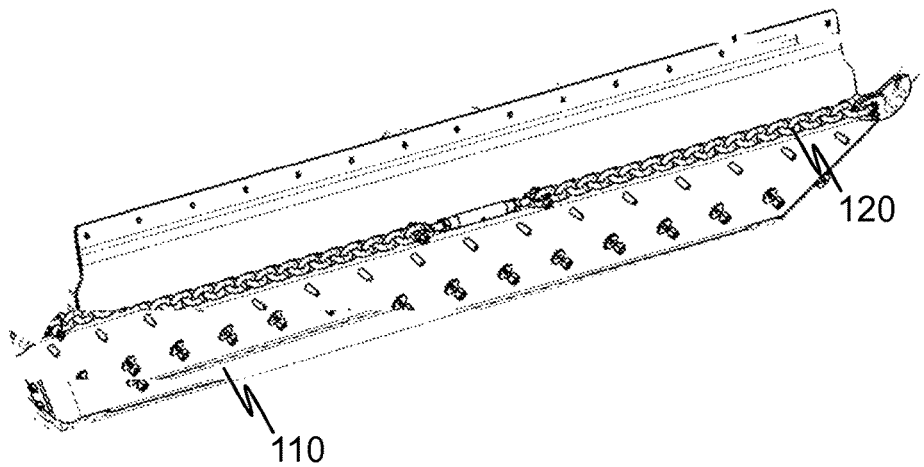
FIG. 4 shows a schematic view of the flexible connection wall according to an example embodiment of the invention.

FIG. 4 shows a schematic view of the flexible connection wall according to an example embodiment of the invention. According to an embodiment, the support member 120 is attached to the flexible member 110 by folding the edge of the flexible member 110 around the support member 120. FIG. 4 shows this edge folding in an unassembled state. In an example embodiment, the support member 120 comprises a chain or two or more chains attached to each other. In a further example embodiment, the support member 120 comprises a cable or a further elongated member being flexible or, if the support member comprises rigid portions, having at least four joints, i.e. hinge or pivot points on which the support member 120 may be folded. Even though a single support member 120 is shown in an embodiment, a skilled person appreciates that in an embodiment, for example depending on the height of the flexible member 110 or on the composition of the hinged side walls 130a,130b, the connection wall comprises one or more support members 120. In a further example embodiment, the support member 120 is an integral part of the flexible member 110, for example a portion of the flexible member with added reinforcement material or a thicker portion of the flexible member 110.

Figure 5:
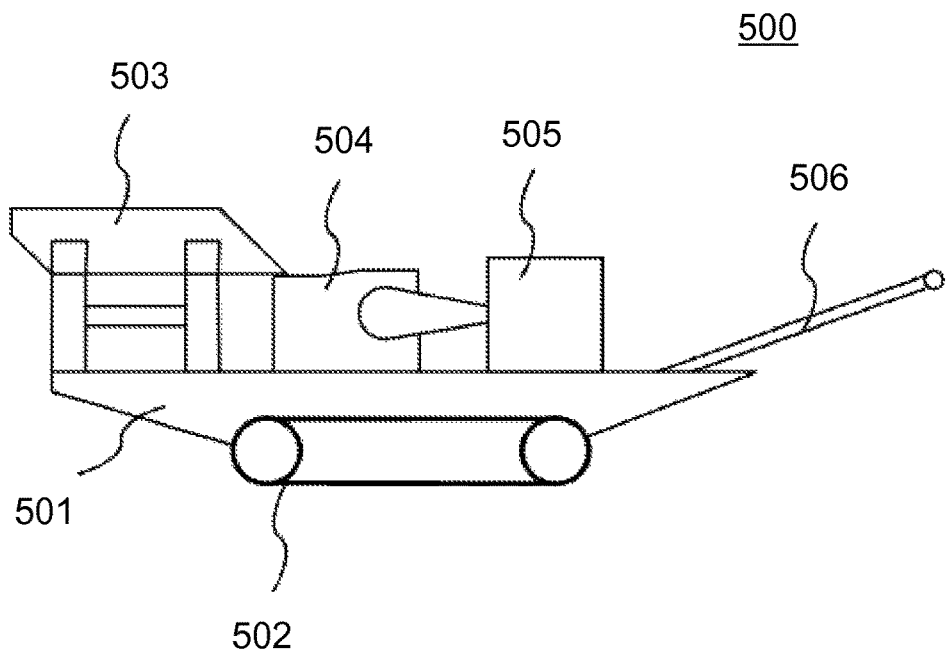
FIG. 5 shows a mineral material processing plant according to an example embodiment of the invention.

FIG. 5 shows a mobile mineral material processing plant 500 according to the invention comprising a feeder hopper 503 according to the invention for feeding material into a processing unit 504, such as onto a screen and a belt conveyor 506 for conveying the product further away from the processing plant. The processing plant 500 further comprises a power source and a control centre 505. The power source may be for example a diesel or electric engine that provides energy for the process units and hydraulic circuits. In an embodiment the processing unit 504 comprises a screen. In a further embodiment, the processing unit comprises a crusher, such as a jaw crusher, a cone crusher, a gyratory crusher, a roller, a horizontal shaft impact crusher or a vertical shaft impact crusher.

The feeder, the processing unit, the power source and the conveyor are attached to a frame 501 which in this embodiment further comprises a track base 502 for moving the processing plant. The processing plant may also be completely or in part wheel-based or movable on legs. Alternatively, it may be movable or towable with for example a truck or other external power source. In addition to the hereinbefore, the processing plant may also be a stationary processing plant.

Figure 6:
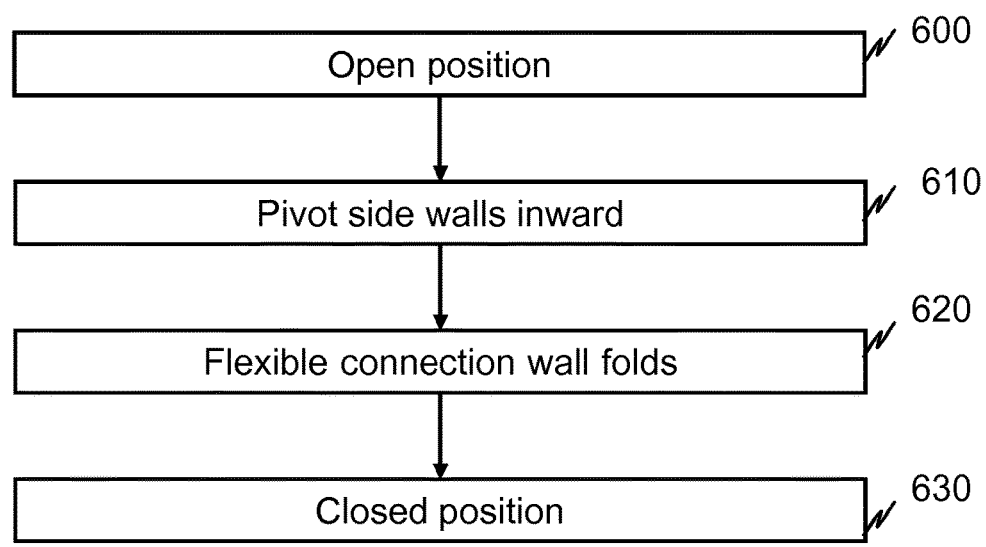
FIG. 6 shows a flow chart of the method of operating the hopper according to an example embodiment of the invention.

FIG. 6 shows a flow chart of the method of operating the hopper according to an example embodiment of the invention. At step 600, the feeder hopper is in the open position, i.e. the hinged side walls 130a,130b are open and the hopper may be loaded with mineral material. In the open position, the wall comprising the flexible member 110 is spread to its full size and the support member 120 supports the flexible member in order to attain more robustness and rigidity. In an embodiment, the support member 120 also at least in part supports the hinged side walls 130a,130b in a correct orientation. In a further embodiment, the support member completely supports the hinged side walls, so that no additional support elements are needed on the side walls or on the bottom of the hopper. In order to switch to the closed position, the hinged side walls 130a,130b are folded, or pivoted, inwards towards the inside of the hopper. The folding is carried out e.g. by hydraulic actuators. In response to the hinged side walls 130*a*,130*b* being folded, i.e. concurrently with them folding, the connection wall comprising the flexible member 110 and the support member 120 folds together at step 620. At step 630, the closed position of the hopper is reached. A skilled person appreciates that the operation from the closed position back to the open position happens in similar manner. The flexible connection wall according to the invention requires no manual assembly in order to operate, i.e. no loosening of bolts, opening of latches or the like is required as the connection wall folds on its own as the hinged side walls 130*a*,130*b* are operated.

Without in any way limiting the scope of protection, interpretation or possible applications of the invention, a technical advantage of different embodiments of the invention may be considered to be a simpler and faster solution compared to removable or hinged rigid connection wall. Further, a technical advantage of different embodiments of the invention may be considered to be saving of space in transport position. Still further, a technical advantage of different embodiments of the invention may be considered to be safer operation of the hopper as no manual assembly or disassembly and consequently no climbing on the processing plant is required. Further, a technical advantage of different embodiments of the invention may be considered to be a faster operation of the plant to the operating state from the transport state and vice versa.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

As such, the foregoing description shall be considered as merely illustrative of the principles of the invention, and not in limitation thereof. Hence, the scope of the invention is only restricted by the appended patent claims.

The invention claimed is:

1. A hopper having an open interior size to receive material, comprising:
   hinged side walls configured to be pivoted between a first, open position and a second, closed position;
   a connection wall attached between the hinged side walls, wherein the connection wall comprises:
   a flexible member; wherein
   the connection wall is configured to fold together and be located in the open interior in response to the hinged side walls being pivoted to the second, closed position and to extend the open interior in response to the hinged side walls being pivoted into the first, open position.

2. The hopper of claim 1, wherein the connection wall further comprises a support member attached to the flexible member.

3. The hopper of claim 1, further comprising means for pivoting the hinged side walls into the first and the second position.

4. The hopper of claim 3, wherein the means for pivoting the hinged side walls comprise hydraulic actuators.

5. The hopper of claim 1, wherein the flexible member comprises rubber.

6. The hopper of claim 1, wherein the flexible member is a one-piece member.

7. The hopper of claim 1, wherein the flexible member comprises flexible and rigid elements.

8. A hopper, comprising:
   hinged side walls configured to be pivoted into a first position and a second position;
   a connection wall attached between the hinged side walls, wherein the connection wall comprises:
   a flexible member;
   a support member attached to the flexible member, wherein the support member comprises a chain or cable; wherein
   the connection wall is configured to fold together in response to the hinged side walls being pivoted from the first position to the second position.

9. The hopper of claim 2, further comprising one or more support members.

10. The hopper of claim 2, wherein the support member is formed as a part of the flexible member.

11. A mineral material processing plant comprising
    a processing unit; and
    a hopper according to claim 1.

12. The mineral material processing plant according to claim 11, wherein the mineral material processing plant comprises a mobile plant.

13. A method for operating a hopper, comprising:
    pivoting hinged side walls from a first, open position inwards towards a second, closed position; wherein
    in response to the hinged side walls being pivoted, a connection wall comprising a flexible member attached between the hinged side walls and a support member folds together, wherein the connection wall is located in an open interior of the hopper when the hinged side walls fold together and the connection wall extends the open interior when the side walls are in the first, open position.

14. The method according to claim 13, further comprising that the support member attached to the flexible member folds together.

* * * * *